United States Patent [19]
Redford

[11] Patent Number: 4,996,420
[45] Date of Patent: Feb. 26, 1991

[54] MEASUREMENT OF OPTICAL ATTENUATION ALONG THE LENGTH OF BENT OPTICAL FIBERS

[75] Inventor: Gary R. Redford, Tucson, Ariz.

[73] Assignee: Hughes Aircraft Company, Los Angeles, Calif.

[21] Appl. No.: 417,370

[22] Filed: Oct. 5, 1989

[51] Int. Cl.⁵ .................. H01J 5/16; G01N 21/00
[52] U.S. Cl. .................. 250/227.24; 356/73.1
[58] Field of Search .................. 356/73.1; 250/227.16, 250/227.24, 227.31; 350/96.29

[56] References Cited

U.S. PATENT DOCUMENTS

| 4,081,258 | 3/1978  | Goell et al.      | 356/73.1 |
| 4,618,212 | 10/1986 | Ludington et al.  | 356/73.1 |
| 4,659,215 | 4/1987  | Sumida et al.     | 356/73.1 |
| 4,714,343 | 12/1987 | Ide               | 356/73.1 |
| 4,775,233 | 10/1988 | Kaneshi et al.    | 356/73.1 |

FOREIGN PATENT DOCUMENTS

| 2744219 | 4/1979  | Fed. Rep. of Germany | 356/73.1 |
| 3544871 | 9/1986  | Fed. Rep. of Germany | 356/73.1 |
| 0199931 | 12/1982 | Japan                | 356/73.1 |
| 0090027 | 5/1984  | Japan                | 356/73.1 |

Primary Examiner—David C. Nelms
Assistant Examiner—Michael Messinger
Attorney, Agent, or Firm—C. D. Brown; R. M. Heald; W. K. Denson-Low

[57] ABSTRACT

Optical signal attenuation due to bends in an optical fiber (12) is measured by bending a segment of the optical fiber (12) into the shape of interest, measuring the attenuation in that segment, propagating the bent region along the length of the optical fiber (12), and repeating the measurement. The attenuation as a function of the position of the bent segment along the length of the optical fiber (12) is thereby measured. The approach is of particular interest in determining peel point bending loses along the length of the optical fiber (12) to identify areas of signal transmission.

15 Claims, 1 Drawing Sheet

MEASUREMENT OF OPTICAL ATTENUATION ALONG THE LENGTH OF BENT OPTICAL FIBERS

BACKGROUND OF THE INVENTION

This invention relates to the characterization of optical fibers, and, more particularly, to the measurement of optical attenuation resulting from bending of an optical fiber as the bent region is propagated along the length of the optical fiber.

Optical fibers are strands of glass fiber processed so that light transmitted therethrough is subject to total internal reflection. A large fraction of the incident intensity of light directed into the fiber is received at the other end of the fiber, even though the fiber may be hundreds of meters long. Optical fibers have shown great promise in communications applications, because a high density of information may be carried along the fiber and because the quality of the signal is less subject to external interferences of various types than are electrical signals carried on metallic wires. Moreover, the glass fibers are light in weight and made from a highly plentiful substance, silicon dioxide.

Glass fibers are typically fabricated by preparing a preform of glasses of two different optical indices of refraction, one inside the other, and processing the preform to a fiber. The optical fiber is coated with a polymer layer termed a buffer to protect the glass from scratching or other damage. As an example of the dimensions, in a typical configuration the diameter of the glass optical fiber is about 125 micrometers, and the diameter of the fiber plus the polymer buffer is about 250 micrometers (approximately 0.010 inches).

For such very fine fibers, the handling of the optical fiber to avoid damage that might reduce its light transmission properties becomes an important consideration. In one approach, the fibers are wound onto a cylindrical or tapered cylindrical bobbin with many turns adjacent to each other in a side by side fashion. After one layer is complete, another layer of fiber is laid on top of the first layer, and so on. The final assembly of the bobbin and the wound layers of fiber is termed a canister, and the mass of wound fiber is termed the fiber pack. When the optical fiber is later to be used, the fiber is paid out from the canister in a direction parallel to the axis of the cylinder.

It has been found by experience that, where the fiber is to be paid out from the canister in a rapid fashion, as for example over a hundred meters per second, the turns of optical fiber must be held weakly in place on the canister with an adhesive. The adhesive holds each turn of fiber in place as adjacent turns and layers are initially wound onto the canister, and also as adjacent turns and layers are paid out. Without the use of an adhesive, payout of the fibers may not be uniform and regular, leading to snarls or snags of the fibers that damage them or cause them to break as they are paid out.

When the optical fiber held in place with an adhesive is paid out from the canister in a direction parallel to the cylindrical axis of the canister, the optical fiber is bent through an angle, called the peel angle, with a relatively small bend radius. It is known that bending of the fiber through a bend having a small radius of curvature, such as that experienced during payout, reduces the transmission of light through the fiber. That is, the light passing through the optical fiber can be attenuated simply because of the presence of a bend in the optical fiber.

As the length of optical fiber is peeled from the canister, each segment of optical fiber is progressively bent through the peel bend angle. It has previously been the practice to measure the optical attenuation of a sample of the optical fiber and then to assume that the remainder of the optical fiber would exhibit a similar attenuation. This assumption is not necessarily a good one, as slight irregularities in the optical fiber, which may be found at only one point along the length of the optical fiber, can cause significantly higher attenuation as that portion of the optical fiber is peeled from the canister.

There therefore exists a need for an improved approach for measuring optical attenuation due to peel bending of an optical fiber. The present invention fulfills this need, and further provides related advantages.

SUMMARY OF THE INVENTION

The present invention provides an approach for measuring the optical signal attenuation of an optical fiber due to bending of the optical fiber, at all locations along the length of the optical fiber. The process is readily implemented for a wide variety of bend shapes and radii. The optical fiber may be inspected at sufficiently high rates that it is feasible to inspect the entire fiber pack prior to winding onto the bobbin.

In accordance with the invention, a process for simulating and testing the optical signal attenuation of an optical fiber resulting from peel point bending as it is dispensed from a canister comprises the steps of bending an optical fiber into a bent shape simulating the peel point bending of an optical fiber; measuring the loss of transmitted light energy resulting from the curvature of the bent shape; and propagating the bent shape along the length of the optical fiber, and repeating the step of measuring.

Stated alternatively, a process for simulating and measuring the optical signal attenuation of an optical fiber resulting from the introduction of curvature into the optical fiber during use comprises the steps of furnishing a loss measurement apparatus that bends a segment of a length of an optical fiber into a curved shape; introducing an optical fiber into the loss measurement apparatus; measuring the loss of transmitted light energy resulting from the curvature produced by the loss measurement apparatus; and passing the length of the optical fiber progressively through the loss measurement apparatus to bend successive segments of the optical fiber, while continuing to measure the loss of light energy from the optical fiber.

With the present approach, a segment of the optical fiber is bent into the desired shape to simulate the peel bending, or other shape of interest. The attenuation of transmitted light due to the bent segment is measured. The bend is then moved to another segment, preferably progressively as by passing the optical fiber over a properly shaped mandrel. The attenuation is then measured at the new location. With a preferred approach, the propagation of the bent segment is continuous, and the measurement of the light attenuation is also continuous, so that a continuous record of attenuation can be made.

DETAILED DESCRIPTION OF THE INVENTION

In accordance with the present invention, apparatus for simulating and measuring the optical signal attenuation of an optical fiber resulting from the introduction of a curvature into a length of the optical fiber during use, as that curved length is moved through the optical fiber comprises means for bending a length of the optical fiber into a preselected curved shape; means for passing the optical fiber progressively through the means for bending; means for introducing light into the optical fiber in a portion of the optical fiber separated in one direction along the optical fiber from the length currently bent into a curved shape; means for receiving light from the optical fiber in a portion of the optical fiber separated in the other direction along the optical fiber from the length currently bent into a curved shape; and means for determining the attenuation of light due to the presence of the curved shape in the optical fiber.

Figure 1:
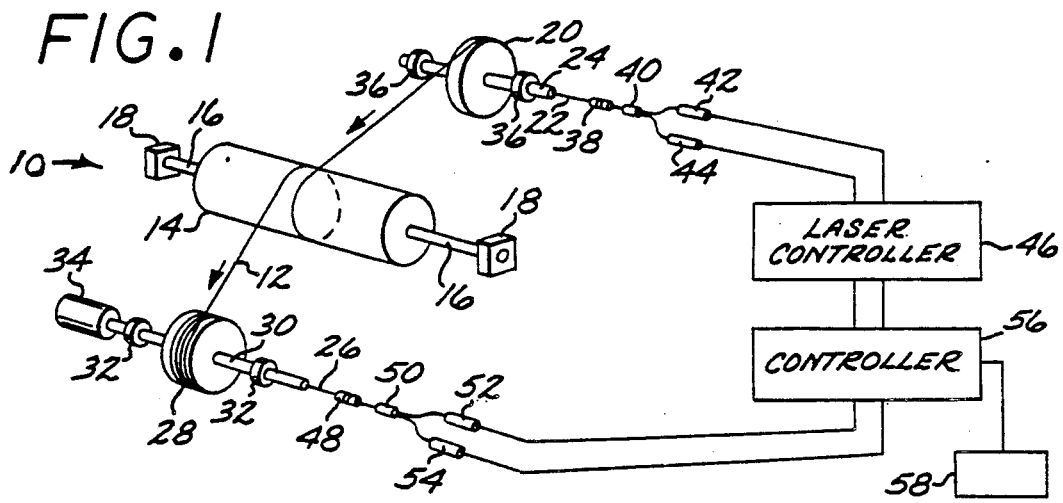
FIG. 1 is a perspective view of a preferred apparatus for practicing the invention, using end injection and extraction of light.
Figure 2:
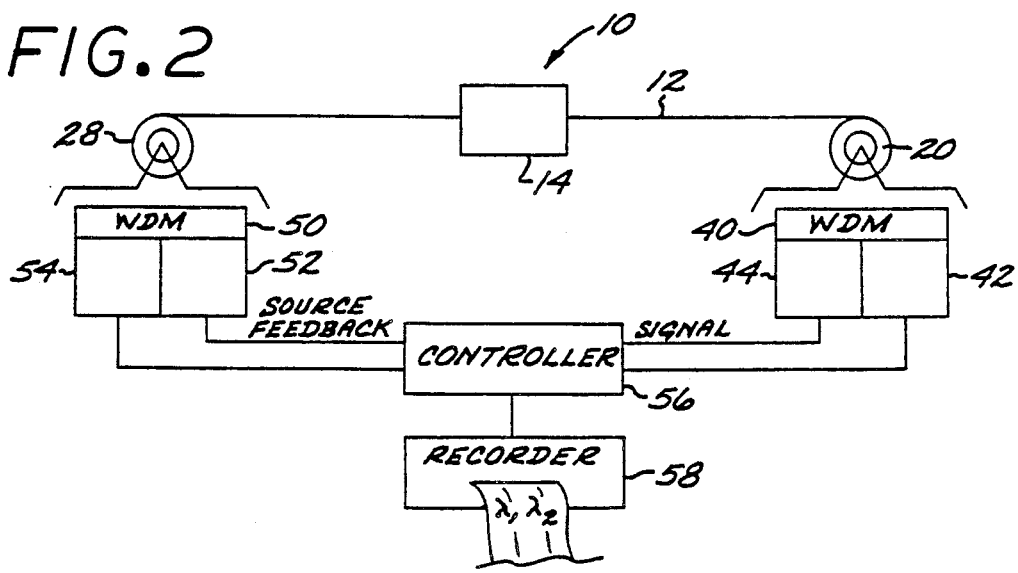
FIG. 2 is a schematic view of the apparatus used to practice the process of the invention.

An apparatus 10 used to measure attenuation of light in an optical fiber 12 is illustrated generally in FIG. 1, and schematically to show the relationship of the control, measurement, and bending elements in FIG. 2. The apparatus 10 may be used in a variety of circumstances, but for definiteness it will be described in relation to its preferred use, simulation and measurement of light attenuation due to bending of an optical fiber that is subsequently to be wound onto a canister. The minimum radius of curvature $r_{min}$ experienced by the optical fiber 12 during payout from the canister is known from experience and calculation. The present approach is used to determine the optical attenuation at each location along the length of the optical fiber 12 when subjected to bending of radius $r_{min}$.

The apparatus 10 includes a bending mandrel 14 around which the optical fiber 12 is bent or wound. The mandrel 14 is cylindrical, with a cylindrical radius of curvature equal to that of the smallest radius of curvature experienced by the optical fiber during the use of interest, in this case a radius $r_{min}$. The mandrel 14 has a cylindrical axle 16. The mandrel 14 is supported on the axle 16 by supports 18. The supports 18 may be stationary blocks, bearings, or motorized bearing supports that may be driven at a controllable speed.

The optical fiber 12 is furnished on a supply spool 20, typically in a length of 5 kilometers or more. A first free end 22 of the optical fiber 12 extends from the interior of the mass of optical fiber 12 out a hollow axle 24 of the supply spool 20. A second free end 26 of the optical fiber 12 is wound around the mandrel 14 the necessary amount to bend the optical fiber to achieve the required radius of curvature and length of bending. In FIGS. 1 and 2 the optical fiber 12 is shown as having one full turn around the mandrel 14. Less than one full turn or more than one full turn could alternatively be used as required. Multiple turns can be used to give an increased amount of attenuation, which can then be corrected by a geometric calculation to account for the proper bent length of the optical fiber when paid out from a canister. The path of the optical fiber 12 can also be displaced in the direction parallel to the axle 16, to apply a twist to the optical fiber during the text, if such a twist occurs under actual canister payout conditions.

The use of the mandrel thus provides the opportunity to test under a variety of simulated conditions. The portion of the length of the optical fiber that is bent in the manner intended for the test is termed a segment.

The second free end 26 is wound onto a takeup reel 28. The second free end 26 is passed through an opening in the circumference of the reel 28, through the interior of the reel 28, and out through a hollow axle 30.

The takeup reel 28 is supported on bearings 32, and is rotationally driven by a motor 34 so as to draw the optical fiber 12 off the supply spool 20, over the mandrel 14, and onto the takeup reel 28. New segments of the optical fiber are thereby continuously (or discontinuously, if the motor is started and stopped periodically) moved to the mandrel and the measurement position. Alternatively stated, the portion or segment being measured is propagated along the length of the optical fiber. The supply spool 20 is mounted on bearings 36. The supply spool 20 could if necessary be driven by a motor, but preferably is not so driven. The power supplied to the takeup reel 28 by the motor 34 is easily sufficient to move the optical fiber 12 over the mandrel 14.

Light transmission through the optical fiber 12 is measured by passing light through the length of the optical fiber 12, in the embodiment of FIGS. 1 and 2. The first free end 22 terminates in a rotating optical coupler 38. Light from a light source is introduced into the optical fiber 12 through the optical coupler 38. In the most preferred embodiment, it is of interest to measure attenuation for two different wavelengths of light. The rotating optical coupler 38 is connected to a wave division multiplexer 40, which receives light from a first laser 42 operating at a first wavelength and from a second laser 44 operating at a second wavelength. The lasers 42 and 44 are powered and controlled by a laser controller 46. By means of the controller 46, lasers 42 and 44, wave division multiplexer 40, and optical coupler 38, monochromatic light at two different wavelengths is introduced into the optical fiber 12.

At the takeup end of the optical fiber, the second free end 26 terminates in a rotating optical coupler 48. The light passed through the optical coupler 48 enters a wave division multiplexer 50, where it is split into the two component wavelengths that were originally introduced into the optical fiber 12. The first wavelength is detected by a first detector 52, and the second wavelength is detected by a second detector 54. The detected signals, which measure the light received through the optical fiber 12, are provided to a controller 56, as are intensity signals, which measure the light introduced into the optical fiber 12, from the laser controller 46.

The light attenuation as the light passes through the optical fiber 12 is the difference in the received and introduced light intensities, as determined by the controller 56 and continuously output to an output device 58 such as a strip chart recorder. The light attenuation is the sum of two components, that produced by bending over the mandrel 14 and that produced by unbent attenuation through the length of the optical fiber 12. (Although the optical fiber is wound over the supply spool and the takeup reel, the radii of curvature of the spool and the reel are selected to be so large that any bending attenuation in them is negligible.)

Since the light is passed through the entire length of the optical fiber 12 during all times of the testing, the attenuation due to unbent attenuation is a constant that may be considered a bias signal and thereby eliminated. The unbent attenuation bias signal may be subtracted as an arbitrary constant, or, if an absolute measurement is required, the bias signal may be measured before the optical fiber is wound around the mandrel. On the other hand, the attenuation due to the bending of the segment of the optical fiber that passes over the mandrel 14 changes because the bent attenuation characteristics of each segment of the optical fiber may vary. It is this variation that the present testing records.

The apparatus 10 just described has been constructed and used to measure the attenuation of the transmitted light in lengths of optical fiber over 5 kilometers long, with light wavelengths of 1300 and 1500 nanometers as the two measuring wavelengths. The mandrel radius $r_{min}$ was selected as 0.085 inches. Continuous measurements of the attenuation due to bending were obtained at linear fiber speeds of 3-6 meters per second.

Figure 3:
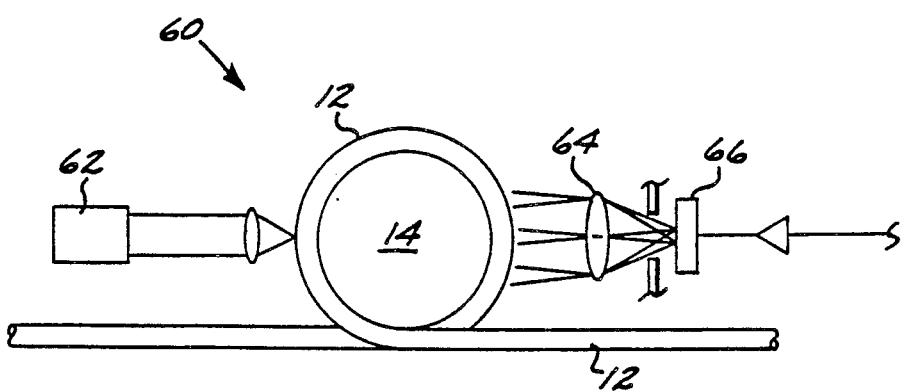
FIG. 3 is a schematic view of another apparatus that may be used in practicing the approach of the invention.

An alternative apparatus 60 is illustrated in FIG. 3. In this apparatus 60, the optical fiber 12 is supplied from the supply spool, passed over the bending mandrel 14, and taken up by the takeup reel. The principal difference with the prior apparatus 10 is that the light whose attenuation is to be measured is introduced into, and received from, the optical fiber 12 laterally through the sides of the optical fiber rather than longitudinally through its ends. It is known that light can be introduced transversely into and removed transversely from the optical fiber when it is bent, and this effect is in part responsible for the bend attenuation that is measured by the present approach.

A transverse injection light source 62, such as a laser, is directed toward the lateral surface of the optical fiber in one portion of its bent region. A field lens 64 concentrates light emitted through the lateral surface of the optical fiber at another portion of its bent region. The light from the lens is focussed upon a detector 66. (In this illustrative embodiment, only one light wavelength is used, although both the FIG. 1-2 and FIG. 3 embodiments of the invention may be used with one, two, or more light sources and a corresponding number of detectors.) The controller 56 detects the difference in the light energy introduced into and received from the optical fiber, and calculates the light attenuation in the manner previously discussed.

The present invention thus provides a well controlled, fast, continuous approach for determining the attenuation due to bend losses in optical fibers. Although particular embodiments of the invention have been described in detail for purposes of illustration, various modifications may be made without departing from the spirit and scope of the invention. Accordingly, the invention is not to be limited except as by the appended claims.

What is claimed is:

1. A process for simulating and testing the optical signal attenuation of an optical fiber resulting from peel point bending as it is dispensed from a canister, comprising the steps of:
   bending an optical fiber into a bent shape simulating the peel point bending of an optical fiber;
   measuring the loss of transmitted light energy resulting from the curvature of the bent shape; and
   propagating the bent shape along the length of the optical fiber, and repeating the step of measuring.

2. Apparatus for simulating and measuring the optical signal attenuation of an optical fiber resulting from the introduction of a curvature into a length of the optical fiber during use, as that curved length is moved through the optical fiber, comprising:
   means for bending a length of the optical fiber into a preselected curved shape;
   means for passing the optical fiber progressively through the means for bending;
   means for introducing light into the optical fiber in a portion of the optical fiber separated in one direction along the optical fiber from the length currently bent into a curved shape;
   means for receiving light from the optical fiber in a portion of the optical fiber separated in the other direction along the optical fiber from the length currently bent into a curved shape; and
   means for determining the attenuation of light due to the presence of the curved shape in the optical fiber.

3. The apparatus of claim 2, wherein the means for passing and the means for determining may operate simultaneously.

4. The apparatus of claim 2, wherein the means for bending includes a mandrel.

5. The apparatus of claim 2, wherein the means for passing includes a supply spool from which optical fiber is unwound prior to entering the means for bending and a takeup reel upon which the optical fiber is wound after passing through the means for bending.

6. The apparatus of claim 2, wherein the means for introducing includes a laser that injects light into the end of the optical fiber.

7. The apparatus of claim 2, wherein the means for introducing includes a laser that injects light into the side of the optical fiber.

8. A process for simulating and measuring the optical signal attenuation of an optical fiber resulting from the introduction of curvature into the optical fiber during use, comprising the steps of:
   bending a segment of a length of an optical fiber in a curved shape;
   measuring the loss of transmitted light energy resulting from the curvature produces by the bending;
   passing the length of the optical fiber progressively over the curved shape to bend successive segments of the optical fiber, while continuing to measure the loss of light energy from the optical fiber.

9. The process of claim 8, including winding the optical fiber around a mandrel.

10. the process of claim 8 including the step of introducing light into the optical fiber form an end thereof.

11. The process of claim 8 including the step of introducing light into the optical fiber from a side thereof.

12. The process of claim 8 wherein said bending step includes the step of bending the optical fiber into a shape simulating that produced in the optical fiber as it is dispensed from an optical fiber canister and the measurement of light attenuation is over that simulated shape.

13. The process of claim 8 further including the step of feeding said optical fiber from a supply spool and taking it up by a takeup spool during the step of passing.

14. The process of claim 8 further including the step of moving said optical fiber continuously during the passing step.

15. The process of claim 8 further including the step of measuring continuously during the passing step.

* * * * *